March 24, 1942.    H. NUTT ET AL    2,277,603
CLUTCH PLATE
Filed Sept. 22, 1939
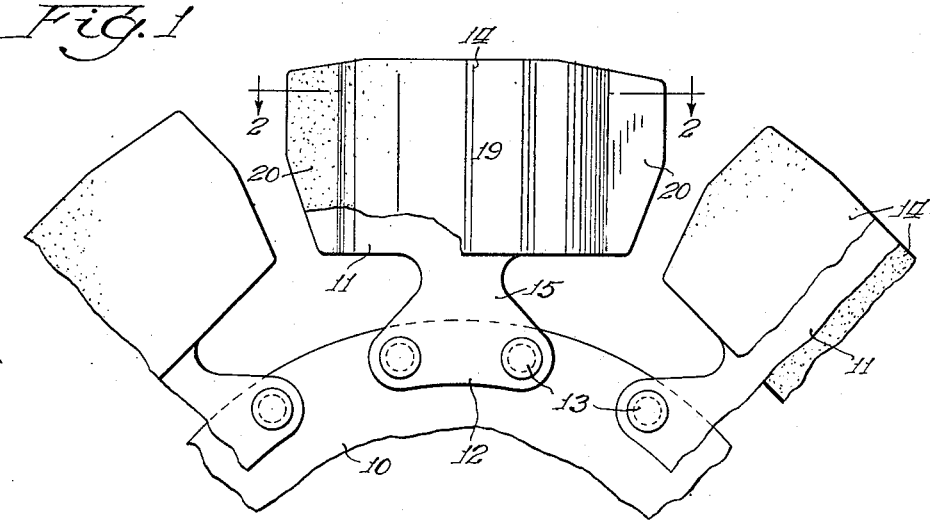
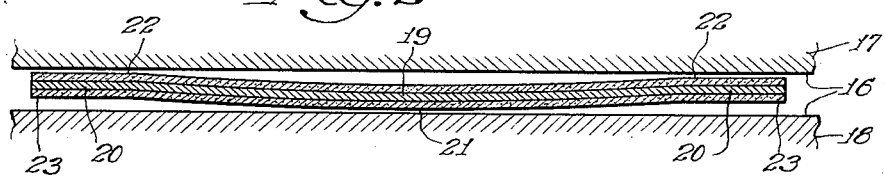
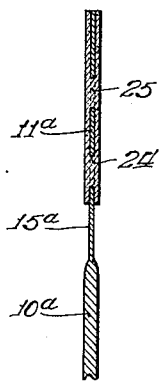
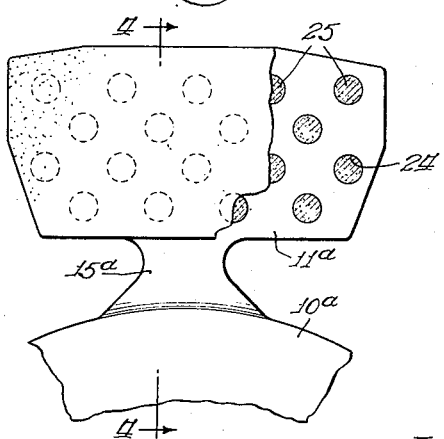
Inventors:
Harold Nutt and
Harold V. Reed.
By: Edward C. Gritzbaugh
Atty.

Patented Mar. 24, 1942

2,277,603

UNITED STATES PATENT OFFICE 2,277,603

CLUTCH PLATE

Harold Nutt and Harold V. Reed, Chicago, Ill., assignors to Borg-Warner Corporation, Chicago, Ill., a corporation of Illinois Application September 22, 1939, Serial No. 296,078

2 Claims. (Cl. 192—107)

This invention relates to clutch plates for friction clutches and has as its general object to provide an improved, simplified, inexpensive clutch plate particularly adaptable for use as the driven member of a conventional motor vehicle friction clutch. This application is a continuation in part of our application Serial No. 282,656, filed July 3, 1939, for Clutch plate.

An object of our invention is to provide a clutch plate having friction facings of completely uniform texture throughout, which are secured to the supporting disc without the use of rivets and are therefore incapable of scoring the friction faces of the driving members of the clutch, irrespective of the depth to which said facings may become worn.

Another object of the invention is to provide a clutch plate having friction facings that will withstand the most severe abuse without being torn from the supporting disc.

Another object is to provide a clutch plate having a minimum spinning inertia combined with ample load carrying strength.

Another object of the invention is to provide a clutch plate having friction facings that are completely immune to disintegration from the heat developed in normal clutch operation.

Another object is to provide a clutch plate of the "cushioning" type, adapted to give a maximum "softness" of cushioned engagement.

A further object of the invention is to provide a clutch plate having a minimum axial dimension between its friction faces.

Another object is to reduce the cost of manufacture of clutch plates.

Other objects, the advantages and uses of the invention will become more apparent after reading the following specification and claims, and after consideration of the drawing forming a part of the specification, wherein:

Fig. 1 is an elevation of a portion of a clutch plate embodying the invention;

Fig. 2 is a sectional view thereof taken as indicated by the line 2—2 of Fig. 1;

Fig. 3 is an elevation of a portion of a somewhat modified form of the invention; and Fig. 4 is a sectional view taken as indicated by the line 4—4 of Fig. 3.

As an example of one form in which the invention may be embodied, I have shown in Figs. 1 and 2 of the drawing, a clutch plate embodying a relatively thick non-yielding central disc 10, an annularly arranged series of cushions 11 of relatively thin yieldable sheet metal such as spring steel, each having a tab portion 12 riveted as at 13 to the periphery of the disc 10, and friction facings 14 secured to the respective sides of each cushion.

Each cushion 11 is connected to its tab 12 by means of a reduced neck region 15, and its respective end regions are thus capable of freely flexing in an axial direction. Cushioned engagement between the opposed friction faces 16 of a pair of driving elements 17 and 18, is developed as a result of the formation of each cushion 11 with a relatively long semi-elliptical central span 19 and two relatively short reversely bent regions 20 at its respective ends. The purpose of these reversely bent regions 20 is to prevent the spring from becoming flattened out without developing the desired load.

Prior to the present invention, there has been available clutch plates embodying a pair of annular friction facings of composition material, mounted upon the respective sides of a series of annularly arranged cushion members. In such a clutch plate of the type that has proven successful in operation, however, the friction facings have been arranged to remain substantially parallel to the friction faces of the driving members, and the flexing has been confined to the cushion members. Where attempts have been made to cause the facings to conform to the curvature of the cushions at all times, such attempts have proven unsuccessful for several reasons. In the first place, where separate friction facings of composition material are employed, the only satisfactory method yet found, of attaching the facings to the cushions is by means of rivets. Such rivets must be countersunk in order to avoid engagement between the rivets and the driving members, and the portions of the friction facings that are available for frictional engagement are restricted to those portions projecting beyond the rivets. The remainder of the facings is utilized in gaining a purchase upon the heads of the rivets. As a result, the facings must be considerably thicker than they would have to be if they were completely consumed in clutching operation. Facings of such thickness do not flex readily and, if securely attached to the cushions would seriously impair the flexibility thereof. Furthermore, they would tend to pull away from the cushions as a result of their resistance to flexing. In order to counteract this tendency, so many rivets would have to be employed that the remaining available friction surface would be seriously reduced.

The present invention provides a clutch plate which eliminates all of these objectionable features by combining, with an annular series of light weight cushion elements, connected to a supporting plate by means of reduced neck regions, a series of facings, individual to and substantially coextensive with the respective cushion elements, said facings being relatively thin and secured to the cushion elements in such a manner that rivets are dispensed with and the facings in effect become integral with the cushion elements and are adapted to flex in complete conformity therewith at all times.

In the preferred form of the invention shown in Figs. 1 and 2, the facings are actually united to the cushion in an integral manner, being of a material, such as metal, which is capable of thus becoming integrally united to a metal surface. The material that we prefer to employ is a tough, long-wearing material such as bronze. The preferred method of applying the facing material is by a process known as "sintering," wherein the facing material, initially in powdered form, is applied to the surfaces of the cushion under high temperature and pressure in a suitable mold or die. The temperature is sufficiently high to cause the metal particles to flux and bond to each other and to the surfaces of the cushion. The resulting friction facings have a porous, spongy texture which prevents the friction surfaces from becoming too smooth as they wear down. As a result, the friction coefficient of the facings remains at a satisfactorily high level.

Being integrally united to the cushions, the facings will conform at all times to the curvature of the cushion and will flex during clutch engagement without becoming loose from the cushions. Since there are no rivets in the structure, the facings may wear down to paper thinness without scoring the faces of the driving members. Thus all of the facings may be consumed in clutch operation and their life will be comparable to that of conventional friction facings of much greater thickness.

The cushions themselves being of extreme thinness, only a fraction of the thickness of the disc 10, the total axial thickness of the plate segments is greatly reduced. In the development of automatic transmissions, which occupy considerably more space than the manually operated transmission formerly employed, the axial dimensions have been so increased that any decrease in the dimensions of the clutch is a distinct advantage, and the present invention provides for a certain amount of decrease in axial dimension of a clutch.

In addition, the extreme thinness of the clutch segment provides a high degree of resiliency in the segment as a whole, even though the friction facings are required to flex along with the cushions. Thus the invention achieves "softness" of cushioning action to counteract the added stiffness caused by flexing the facings. Another factor in the achieving of maximum resiliency of engagement is the length of the span 19 of the cushion as compared to the relatively short reverse span 20. In the initial engagement, the central region of the convex side of this span, indicated at 21, and the two ends of the concave side of the span, indicated at 22, will engage the respective faces 16, of the driving members. The yieldability of the central span is high owing to its length. As the friction faces 16 approach each other however, the ends of the reversely bent portions 20, indicated at 23, will contact the face of the driving member 18, and further clutch engagement will cause these reversely bent end regions to flex in a direction opposite to the flexing of the central span 19. Because of their shortness, however, the resistance of the end regions 20 will be much higher than that of the central span 19, and the load will build up rapidly as clutch engagement nears completion. Thus the invention provides suitable softness of cushioning in the initial stage of clutch engagement, with a build up to ample load as clutch engagement nears completion.

Another factor in achieving softness of cushioning, is the separation of the friction facings into individual segments. Where the facings are in continuous annular form, the cushions, in straightening out, must elongate circumferentially. The friction developed between the cushions and the areas of the friction facings against which they slide, during such elongation, adds to the resistance to compression of the cushions. This is particularly important in connection with the feature of securing the facings intimately to the cushions so as to cause them to flex therewith, since, if continuous annular facings were thus secured to undulated cushions, the bridging of the facings between cushions would tend to restrain the attached regions from flexing freely.

The facings may be applied to the cushions prior to the attachment of the cushions to the discs 10, thus considerably simplifying the sintering operation.

The invention provides a clutch plate having a greatly reduced spinning inertia. This is accomplished by reducing the thickness of the cushion portions of the plate to only a fraction of that of previous clutch plates, and by reducing the thickness of the facings. For a given amount of wearing capacity, the facings of the present invention may be reduced to less than half the thickness employed in prior clutch plates. A very high reduction in spinning inertia may thus be secured.

The invention embraces not only a construction wherein the cushions are formed separately from the mounting plate 10, but one in which they are integral therewith, as shown in Figs. 3 and 4. In this case, the mounting plate 10a, of relatively heavy unyielding material, has a peripheral region comprising an annular series of cushion elements 11a of reduced thickness, integrally united thereto by the narrowed neck regions 15a.

The facings, instead of being metal, as in the preferred form of the invention, may be of a composition material, molded on to the cushions and secured by tying the opposite facings together through the cushion elements. Such a construction is shown in Fig. 3, wherein the cushion elements are provided with a series of spaced apertures 24 through which extend plugs 25 of the facing material, tying together the two facings and making them, in effect, integral with the cushion 11a although the adhesion between the contacting faces of the cushion and facing may be negligible. A material that we prefer to employ in this form of the invention, is a composition comprising asbestos shreds mixed with comminuted copper and Bakelite powder, molded under heat and pressure in a suitable mold or die into which the cushion 11a has been inserted.

While we have described our invention in connection with certain specific embodiments thereof, it is to be understood that this is by way of illustration and not by way of limitation and the scope of our invention is defined solely by the appended claims which should be construed as broadly as the prior art will permit.

We claim:

1. In a friction clutch plate, a mounting disc comprising a substantially circular central disc portion having a radius more than half but substantially less than the total radius of the driven plate, said central disc portion being of sheet metal of such thickness as to be substantially unyielding and to adequately withstand the torque loads imposed upon it during clutch operation, and a peripheral region having a low rotational inertia, said peripheral region comprising a plurality of yieldable cushion members of materially lesser thickness and weight per unit area than said disc portion, said cushion members occupying an annular region the inner extremity of which lies radially beyond but relatively near the periphery of the disc, neck members, of reduced circumferential width compared to that of said cushion members, joining said cushion members to the disc portion, and friction facings bonded to the faces of said cushion members, said cushion members with their attached facings each including an intermediate region joined to said neck member and a pair of wing portions extending on either side of said intermediate region and being bowed circumferentially with a single curvature throughout said intermediate region and throughout major portions of said wing portions and with a reverse bend near the extremity of each wing portion providing a pair of lands adapted on one side to engage one of a pair of clutch driving members while the opposite side of the intermediate region engages the other of said driving members.

2. In a friction clutch, a mounting member comprising a central portion of sheet metal of such thickness as to be substantially unyielding during clutch operation, and a peripheral region having a low rotational inertia, said peripheral region comprising a plurality of yieldable cushion members of materially lesser thickness and weight per unit area than said disc portion, occupying an annular region the inner extremity of which lies radially beyond the periphery of the disc, friction facings attached to said cushion members in such a manner as to flex therewith throughout the circumferential extent of said facings, said cushion members with their attached facings each including an intermediate region and a pair of wing portions extending circumferentially therefrom on either side, and being bowed circumferentially with a single curvature throughout said intermediate region and throughout major portions of said wing portions and with a reverse bend near the extremity of each wing portion providing a pair of lands adapted on one side to engage one of a pair of clutch driving members while the opposite side of the intermediate region engages the other of said driving members, and neck members joining the intermediate regions of said cushion members to said mounting member.

HAROLD NUTT.
HAROLD V. REED.